United States Patent [19]

Strobel et al.

[11] Patent Number: 4,844,979
[45] Date of Patent: Jul. 4, 1989

[54] SHAPED POLYMERIC ARTICLES HAVING IMPROVED RECEPTIVITY TO ORGANIC COATINGS

[75] Inventors: Mark A. Strobel; Krishnakant P. Vora, both of St. Paul, Minn.

[73] Assignee: Minnesota Mining and Manufacturing Company, St. Paul, Minn.

[21] Appl. No.: 829,081

[22] Filed: Feb. 13, 1986

[51] Int. Cl.$^4$ .......................... C09J 7/02; B32B 27/36; B05D 3/14
[52] U.S. Cl. ..................................... 428/354; 428/336; 428/353; 428/355; 428/412; 428/483; 428/516; 427/324
[58] Field of Search ............... 428/336, 353, 354, 355, 428/412, 483, 516; 427/324

[56] References Cited

U.S. PATENT DOCUMENTS

| | | | |
|---|---|---|---|
| 2,715,075 | 8/1955 | Wolinski | 428/516 |
| 2,795,515 | 6/1957 | Lavanchy | 428/353 |
| 3,075,853 | 1/1963 | Striker | 428/353 |
| 3,197,326 | 7/1965 | Webber | 117/76 |
| 3,274,089 | 9/1966 | Wolinski | 204/165 |
| 3,361,587 | 1/1968 | Memkheim et al. | 428/516 |
| 3,619,272 | 11/1971 | Shepherd et al. | 117/138 |
| 3,676,391 | 7/1972 | Deross | 428/516 |
| 4,055,698 | 10/1977 | Beery | 428/262 |
| 4,137,362 | 1/1979 | Miki et al. | 428/353 |
| 4,465,715 | 8/1984 | Manabe et al. | 427/444 |

FOREIGN PATENT DOCUMENTS

| | | | |
|---|---|---|---|
| 855679 | 11/1970 | Canada | 204/96 |
| 51-54671 | 3/1976 | Japan . | |
| 51-54672 | 5/1976 | Japan . | |
| 51-137796 | 11/1976 | Japan . | |
| 947914 | 1/1964 | United Kingdom . | |
| 1040815 | 9/1966 | United Kingdom . | |

OTHER PUBLICATIONS

Amouroux et al, "Modification of Adh. Properties of Polyethylene in a Carona Discharge, etc.", 1979.
Yagi et al., Article, "Grafting Fluorocarbons to Polyethylene in Glow Discharge", *J. Appl. Polym. Sci.*, 27, 4019 (1982).
A. Dilks, "Characterization of Polymer Molecular Structure by Photon, Electron, and Ion Probes", American Chemical Society, Wash. D.C., 1981, Chapter 18.
D. Briggs et al, "Practical Surface Analysis by Auger and X-Ray Photoelectron Spectroscopy", 1983, Chapter 3.
Strobel, Corn, Lyons & Korba, "Surface Modification of Polypropylene with $CF_4$, $CF_3H$, $CF_3Cl$, and $CF_3Br$ Plasmas", *J. Polym. Sci.*, 23, 1985.
Salem, "Corona Surface Treatment", *Paper, Film & Foil Converter*, pp. 94–96 (Oct. 1978).
Denes, Percec, Totolin and Kennedy, "Cationic Grafting from Plasma-Modified Polymer Surfaces", Springer Verlag *Polymer Bulletin*, 1980.
"Modification of Polyolefin Films by Photochlorination", Journal of Applied Polymer Science, vol. 16, pp. 1997–2012 (1972), by Nakagawa and Yamada.

*Primary Examiner*—P. C. Ives
*Attorney, Agent, or Firm*—Donald M. Sell; Walter N. Kirn; Richard E. Brink

[57] ABSTRACT

The receptivity of shaped polymer articles (e.g., self-supporting films of polypropylene) to subsequently applied organic coatings is enhanced by exposure to an electrical discharge in the presence of a chlorocarbon or chlorofluorocarbon gas, thereby providing an extremely thin chlorine-containing surface layer in which the Cl:C ratio is inversely related to the distance from the face of the layer. Preferred embodiments of the invention include tape products in which the primed surface of the backing is coated with a pressure-sensitive adhesive or a low adhesion backsize.

10 Claims, No Drawings

SHAPED POLYMERIC ARTICLES HAVING IMPROVED RECEPTIVITY TO ORGANIC COATINGS

BACKGROUND OF THE INVENTION

This invention relates to shaped polymeric articles, especially self-supporting films, having improved receptivity to organic coatings and to methods of treating such articles to achieve this effect.

For many years it has been common to employ self-supporting polymeric films as the backing for normally tacky and pressure-sensitive adhesive tapes. Many films, however, do not inherently possess a surface to which pressure-sensitive adhesive bonds firmly enough to provide a satisfactory tape product. Among such films are cellulose acetate, polyester, nylon, and especially polyethylene and polypropylene, which have extremely low energy surfaces. A number of techniques have been employed to increase the receptivity of such films to subsequently applied coatings, involving coextrusion with carboxylated polypropylene, exposure to various types of radiation or, more commonly, application of a primer solution. Polyethylene and polypropylene, for example, are often treated with a chlorinated polymer (e.g., "Hardlen" 13-LP, which is a 5–10% solution of chlorinated polypropylene available from Toyo Kasei Kogyo Co., Ltd., or Eastman CP-343-1 and CP-343-3, which are functionally equivalent solutions in xylene); for convenience, all such primers will be referred to hereinafter as "Hardlen primers". In order to be effective, the Hardlen primer must be applied in an amount sufficient to leave a coating that is at least 10 nanometer thick, thinner coatings failing to provide adequate bonding.

Although the Hardlen primer is effective when applied to polyethylene, polypropylene, or other film surfaces, it requires an additional processing step. Since one of the main reasons for using films such as polyethylene and polypropylene is to reduce cost, the extra priming step tends to offset the advantages of the comparatively inexpensive base film. In addition to the costs incurred in evaporating solvent, curing the chlorinated polymer (or both), there are other expenses in recovering the evaporated solvent and preventing pollution of the atmosphere.

U.S. Pat. No. 4,405,715 describes and claims a process of washing a polyolefin surface in an organic solvent and thereafter plasma treating it in the presence of an "active gas" to improve receptivity to subsequently applied coatings, the exact procedure followed in measuring adherability being difficult to ascertain. The examples all employ oxygen as the active gas, but bromine, ammonia, ozone, and chlorine are also indicated to be acceptable. Each of these gases presents handling problems, and chlorine is sufficiently toxic that it would be avoided in commercial manufacturing procedures.

BRIEF DESCRIPTION

The present invention provides novel shaped polymeric articles, especially films, having a chlorine-containing surface layer that affords excellent receptivity to subsequently applied coatings. These articles can be prepared by a treating process that is simple, convenient, safe, and readily adapted to being carried out continuously in line with subsequent coating processes, thereby reducing the manufacturing cost of finished film-backed tape products. There are no problems of toxicity, pollution, solvent recovery, or curing. The bond strength of pressure-sensitive adhesives to the chlorine-containing surface layer is appreciably greater than to an untreated film as measured by conventional testing procedures. The increase in adhesion should be at least about 2 N/cm and is preferably at least about 50%. The chlorine is grafted to the polymer and hence is not easily solvent-extractable.

Articles of the invention are characterized by having, at one or more exposed surfaces, an extremely thin chlorine-containing layer in which the chlorine:carbon ratio is inversely related to the distance from the surface, whereas the chlorine content in a Hardlen primer is uniform throughout the primer layer. A small amount of fluorine, preferably substantially lower than the amount of chlorine, may also be present in the thin chlorine-containing surface layer.

In accordance with the invention, a shaped article (such as a biaxially oriented polypropylene film) whose surface is free of any chlorine-containing surface layer and which exhibits poor receptivity to organic coatings, is subjected to an electrical discharge treatment in the presence of chlorocarbon or chlorofluorocarbon gas. Two methods of imparting this treatment include glow discharge (plasma) and corona discharge, both of which are broadly old.

In glow discharge treatment in accordance with the invention, the film or other shaped article is placed in an evacuated chamber between electrodes to which an alternating current is applied and the chlorocarbon or chlorofluorocarbon gas introduced into the chamber. Under these conditions the gas becomes ionized, chlorine-containing radicals reacting with and becoming grafted to the object. When the shaped object is a sheet material, it can be continuously passed from atmospheric pressure through a sealing mechanism into the evacuated chamber, subjected to plasma treatment, and removed from the chamber by passing through a second sealing mechanism. The plasma employed can be one or more of the following volatile (preferably gaseous at atmospheric pressure) chlorocarbon or chlorofluorocarbon compounds: $CCl_4$, $CF_2Cl_2$, $CF_3Cl$, $CFCl_3$, $C_2F_5Cl$, $C_2F_4Cl_2$, $C_2F_3Cl_3$ and perhaps others. For obvious reasons the less toxic gases are generally preferred.

It is surprising that fluorine-containing monomers can be used in the practice of this invention, since it would logically be supposed that fluorine would graft to the films and provide a surface of reduced, rather than enhanced, adhesion. Indeed, previous work in this area suggested that plasma fluorination to impart a release surface was desirable; see, e.g., Yagi et al, "Grafting Fluorocarbons to Polyethylene in Glow Discharge," *J. Appl. Polym. Sci.*, 27, 4019 (1982). The present invention recognizes the unexpected and seemingly contraindicated fact that it is possible to achieve chlorination while minimizing fluorination. Applicants have found that one unique advantage of using $CF_3Cl$ is that it is simple and convenient to monitor the effectiveness of the priming process by merely observing the color of the plasma, preferably with an optical emission spectrometer (OES). If the color of the emission is yellowish, indicating the presence of the $CF_3$ radical, successful priming will be accomplished. If, on the other hand, the power per molecule is increased so that the color tends toward blue, it is an indication that the $CF_3$ radical is being broken down to fluorine atoms and/or more reactive fluorine-containing radicals, causing the surface to become fluorinated and hence to possess decreased, rather than increased, receptivity to subsequent coatings.

Successful operating conditions include capacitively-coupled discharges ranging from 60 Hz (preferred) to 13.56 mHz and harmonics thereof, pressures of 30 mtorr-5 torr (preferably 0.1-1 torr), and sufficient power supplied to sustain a stable glow, generally within the range of 0.05-5 watts/cm$^2$ of substrate area (preferably 0.2-1.5 watts/cm$^2$). Satisfactory treatments have been carried out at exposure times as low as 0.5 second. At constant net power, the effectiveness of the plasma treatment decreases as the pressure in the plasma is lowered. At constant pressure, effectiveness decreases as power increases. Exact requirements will be determined by specific equipment used and other operating conditions.

Because glow discharge processes are carried out under vacuum conditions, the equipment is expensive and the plasma grafting process can be technically complex. A more desirable method of chlorinating polymer surfaces would be one in which chlorine is grafted to the polymer surface at atmospheric pressure. A good alternative is corona discharge, which is an electrical discharge at atmospheric pressure consisting of numerous tiny thermal sparks uniformly distributed in a large volume of non-ionized gas utilizing comparatively inexpensive equipment. Corona discharges in air, $CO_2$, $Cl_2$, and $N_2$ are known and widely used in industry; however, little or no work is reported on any corona discharges in chlorocarbon or chlorofluorocarbon gas. Generally speaking, chlorocarbons are somewhat inconvenient to volatilize at atmospheric pressure, and chlorofluorocarbons are much preferred.

In employing corona discharge treatment in accordance with the invention, polymeric sheet material is passed through a narrow slot into a chamber and around a grounded steel drum, from the periphery of which one or more insulated electrodes are closely spaced. The chamber is continuously flushed with chlorine-containing gas (preferably chlorofluorocarbon, for reasons previously discussed), effectively purging it of all but a minute amount of air, while a high voltage alternating current is applied to the electrodes. The voltage breaks down the gas, generating a corona discharge, which results in grafting chlorine-containing radicals to the polymeric backing. The web then exits the chamber through a second narrow slot. Typical effective operating conditions have included 4-30 watts/cm$^2$ at 5-40 kHz so as to provide about 0.4 second exposure time. As with the glow discharge treatment, $CF_3Cl$ is a desirable gas to employ because it permits the operator to monitor the effectiveness of priming by observing the color of the discharge.

In each of the discharge treatments described above, chlorine is chemically grafted to the polymer surface, so that most of it cannot be removed by treating with an organic solvent. X-ray photoelectron spectroscopy (XPS or ESCA) shows that the overall Cl:C atomic ratio in the treated surface layer may range from, e.g., 0.05 to 0.9, preferably 0.15 to 0.6, achieved at minimum exposure time. The Cl:C ratio is greatest at the surface, decreasing at successively lower depths. The total depth of treatment is less than 10, and probably less than 5 nanometers. The overall F:C and O:C ratios are preferably respectively less than 0.05 and less than 0.03, although both values may be higher if the Cl:C ratio is greater than the F:C ratio. A good discussion of the principles of ESCA depth profiling, used to show the Cl:C, F:C, and O:C ratios at various distances from the surface, may be found in A. Dilks, "Characterization of Polymer Molecular Structure by Photon, Electron, and Ion Probes", T. J. Fabish, H. R. Thomas, and D. Dwight, Eds., American Chemical Society, Washington, D.C. 1981, Chapter 18. See also D. Briggs and J. C. Riviere, "Practical Surface Analysis by Auger and X-Ray Photoelectron Spectroscopy", D. Briggs and M. P. Seah, Eds., Wiley, Chichester, 1983, Chapter 3. Neither plasma treatment nor corona discharge treatment appears to alter the roughness of polypropylene as observed using scanning electron microscopy (SEM) at a resolution of about 0.1 micrometer. Hence, all changes in adhesion are believed to be caused solely by chemical modification of the surface.

Among the coatings that have been successfully applied to film surfaces primed in accordance with the invention are rubber-resin pressure-sensitive adhesives, solutions or aqueous dispersions of acrylate-based pressure-sensitive adhesives, acrylonitrile:butadiene copolymers, low adhesion backsizes, and block copolymers, printing inks, magnetic dispersions for audio or video tape, paint, phenolic resin, urethane adhesives, butadiene:acrylonitrile cold seal adhesives, and numerous other coatings. The effectiveness of the priming can be determined by an adhesion test involving the preparatory steps of coating the treated surface with a heptane:isopropanol dispersion of a 95:5 isooctyl acrylate:acrylic acid copolymer, evaporating the solvent, drying 3 minutes at 65° C. to leave an adhesive layer about 20 micrometers thick, and conditioning the adhesive-coated film at 21° C. and 50% humidity for 24 hours. The adhesive surface is than placed in contact with an anodized aluminum plate and the film rolled down with a 1-kg roller to ensure intimate contact. When the film is stripped off at 90° to the aluminum plate at a rate of about 230 cm/minute, the removal force should be at least about 2 N/cm greater than for an unprimed control film; preferably, the removal force should be on the order of 50-100% greater than for an unprimed film. Generally speaking, it is preferred that the predominant mode of adhesive failure is cohesive ("split") rather than separate from the film and adhere to the aluminum plate ("transfer"), although this is not essential in all cases.

DETAILED DESCRIPTION

Understanding of the invention will be further enhanced by referring to the following illustrative but nonlimiting examples, in which all parts are by weight unless otherwise indicated.

EXAMPLE 1

Glow discharge treatment was carried out in a 70-liter glass process chamber, utilizing a capacitively coupled plasma occupying a volume of about 7 liters, generated by a 60-Hz power supply equipped with an isolation transformer and a pair of rectangular stainless steel electrodes, each having an area of 500 cm$^2$. A capacitance manometer was employed to monitor absolute pressure independent of gas composition.

A thermally extruded, biaxially oriented 50-micrometer polypropylene film, 15 cm wide, was transported through the chamber, which was diffusion pumped to $1 \times 10^{-4}$ torr or lower and then back-filled with $CF_3Cl$ gas to 0.4 torr, the flow rate of $CF_3Cl$ being about 220 cm (STP)/min. Net input power supplied to the plasma was 200 watts, or about 0.4 watt/cm$^2$ of substrate area, for an exposure time of about 5 seconds. At these conditions the CF$_3$Cl plasma had a yellowish color. OES showed the presence of CF$_3$ radicals and atomic Cl species.

The treated polypropylene surface was exposed to air and then analyzed for carbon, chlorine, fluorine, and oxygen by ESCA employing a Hewlett-Packard Model 5950B Spectrometer using a monochromatic AlK$_\alpha$ photon source. The electron take-off angle was varied from 18° to 78° to determine surface chemistry as a function of distance beneath the film surface. Spectra were referenced with respect to the 285.0 eV carbon 1s level observed for hydrocarbon. As determined by ESCA, the approximate overall atomic ratios for the treated layer were Cl:C=0.4, F:C=0.02, and O:C=0.01. Variable-angle ESCA also showed that the thickness of the chlorinated layer was considerably less than 10 nm and probably less than 5 nm.

The plasma-treated film was then subjected to the adhesion test previously described, requiring a removal force of 12-14 N/cm, with 100% of the adhesive splitting. After heat-aging at 50° C. for 11 days the removal force was 15-16 N/cm, again with 100% of the adhesive splitting. Where the same test is performed using unprimed film, the adhesion value is approximately 4-6 N/cm both before and after heat-aging, with 100% adhesive transfer.

Tabulated below are the pertinent data from a series of experiments performed on biaxially oriented polypropylene in substantially the same manner as described in Example 1, which is also listed for convenience in reference. Although plasma discharge color is reported for all examples, it is significant only where the gas is CF$_3$Cl; as previously pointed out, discharge color affords a good way of monitoring the effectiveness of priming when this gas is used.

As reported in Table I, the adhesion value is reported as the average of readings obtained. The designations "S" and "T" in the "Mode of Failure" column respectively indicate splitting and transfer of the adhesive layer.

The abbreviation "Comp." indicates a comparative example, illustrating unsatisfactory practice of the invention.

TABLE I

Plasma Priming of Biaxially Oriented Polypropylene

| Example | Plasma Gas | Plasma Pressure, mTorr | Electrical Conditions Frequency Hz | Electrical Conditions Power W/cm$^2$ | Exposure Time, Sec. | Discharge Color | ESCA of Treated Layer Cl:C | ESCA of Treated Layer F:C | ESCA of Treated Layer O:C | Adhesion Bond, N/cm | Adhesion Mode of Failure |
|---|---|---|---|---|---|---|---|---|---|---|---|
| Control A | — | — | — | — | — | — | — | — | — | 6.4 | T |
| 1 | CF$_3$Cl | 400 | 60 | 0.4 | 5.0 | yellow | 0.4 | 0.02 | 0.01 | 12-14 | S |
| 2 | " | 100 | " | 0.06 | 5.0 | " | 0.26 | 0.08 | 0.03 | 11.4 | " |
| Comp. 3 | " | " | " | 0.40 | " | blue | 0.38 | 0.25 | 0.08 | 7.3 | T |
| Comp. 4 | " | " | " | " | 56 | " | 0.27 | 0.49 | 0.13 | 7.4 | " |
| 5 | " | 200 | " | " | 5.0 | yellow-blue | 0.36 | 0.05 | 0.06 | 11.9 | 90:10 S:T |
| 6 | " | 300 | " | " | " | yellow | 0.53 | 0.04 | 0.03 | 12.8 | S |
| 7 | " | " | " | 0.30 | 28.0 | " | 0.60 | 0.08 | 0.09 | 11.9 | 25:75 S:T |
| 8 | " | 400 | " | 0.40 | 2.2 | " | 0.24 | 0.015 | 0.02 | 12.8 | S |
| 9 | " | " | " | " | 1.1 | " | 0.16 | 0.01 | " | 12.0 | " |
| 10 | " | " | " | " | 0.55 | " | 0.12 | 0.003 | " | 11.7 | " |
| 11 | " | 600 | " | " | 5.0 | " | 0.32 | 0.02 | " | 13.2 | " |
| 12 | " | 1000 | " | " | " | " | 0.27 | 0.01 | " | 12.8 | " |
| 13 | " | 400 | 100,000 | 0.32 | 0.7 | " | 0.07 | 0.003 | 0.03 | 11.9 | " |
| 14 | " | " | " | " | 5.0 | " | 0.19 | 0.05 | 0.08 | " | " |
| 15 | CF$_2$Cl$_2$ | 100 | 60 | 0.12 | " | blue | 0.21 | 0.03 | 0.03 | " | " |
| Comp. 16 | " | " | " | 0.40 | " | " | 0.55 | 0.18 | 0.18 | 7.9 | T |
| 17 | " | 300 | " | " | " | " | 0.28 | 0.05 | 0.05 | 12.3 | S |
| 18 | " | 400 | " | " | " | " | 0.25 | 0.04 | 0.04 | 11.9 | " |
| 19 | " | " | " | " | 1.4 | " | 0.11 | 0.01 | 0.01 | " | 75:25 S:T |
| 20 | " | 600* | " | 0.45 | 5.0 | " | 0.21 | 0.04 | " | 11.8 | S |
| 21 | CFCl$_3$ | 100* | " | 0.40 | " | " | 0.29 | " | 0.02 | 12.3 | " |
| 22 | " | 280 | " | " | " | " | 0.09 | 0.01 | 0.01 | 11.0 | " |
| Comp. 23 | C$_2$F$_5$Cl | 100 | " | " | " | " | 0.21 | 0.56 | 0.06 | 7.4 | T |
| 24 | " | 300 | " | " | " | purple | 0.13 | 0.20 | 0.02 | 13.0 | S |
| 25 | C$_2$F$_4$Cl$_2$ | 100 | " | " | " | blue | 0.21 | 0.20 | 0.04 | 12.8 | " |
| 26 | " | 300* | " | " | " | " | 0.09 | 0.07 | 0.01 | 13.3 | " |
| 27 | 1:1 CF$_3$Cl:CF$_2$Cl$_2$ | 400 | " | " | " | yellow | ** | ** | ** | 12.9 | " |
| 28 | 1:1 CF$_3$Cl:C$_2$F$_4$Cl$_2$ | " | " | " | " | " | ** | ** | ** | 13.3 | " |
| 29 | CCl$_4$ | 100* | " | " | " | blue | 0.21 | — | 0.04 | 12.3 | " |
| 30 | " | 300* | " | " | " | " | 0.14 | — | 0.01 | 11.4 | " |

*Unstable glow discharge
**Not measured

A series of plasma priming experiments, similar to those reported in Table I, were performed on various other film backings. Results are set forth in Table II, the following abbreviations being employed:

CA—40-micrometer cellulose acetate
PC—75-micrometer unoriented polycarbonate
PF—30-micrometer polypropylene, biaxially oriented and then retensilized in the machine direction
PET3—75-micrometer biaxially oriented polyethylene terephthalate, containing no slip agent
PET4—100-micrometer biaxially oriented polyethylene terephthalate, containing no slip agent
PE—40-micrometer low density polyethylene

TABLE II

Plasma Priming of Various Films

| Example | Film | Plasma Gas | Plasma Pressure, mTorr | Electrical Conditions Frequency Hz | Electrical Conditions Power W/cm² | Exposure Time, Sec. | Discharge Color | ESCA of Treated Layer Cl:C | ESCA of Treated Layer F:C | ESCA of Treated Layer O:C | Adhesion Bond, N/cm | Adhesion Mode of Failure |
|---|---|---|---|---|---|---|---|---|---|---|---|---|
| Control B | PF | — | — | — | — | — | — | ** | ** | ** | 4.2 | T |
| 31 | " | CF₃Cl | 300 | 60 | 0.40 | 5.0 | yellow | 0.21 | 0.01 | 0.16 | 11.9 | S |
| 32 | " | " | 600 | " | " | " | " | ** | ** | ** | " | " |
| Control C | PC | — | — | — | — | — | — | ** | ** | ** | 12.3 | T |
| 33 | " | CF₃Cl | 400 | 60 | 0.40 | 5.0 | yellow | ** | ** | ** | 15.3 | S |
| Control D | PET4 | — | — | — | — | — | — | 0.00 | 0.00 | 0.40 | 5.0 | T |
| 34 | " | CF₃Cl | 400 | 60 | 0.40 | 5.0 | yellow | 0.29 | 0.02 | 0.36 | 7.0 | T |
| 35 | PET3 | " | 1000 | " | " | " | " | 0.11 | 0.01 | 0.26 | 7.6 | T |
| Control E | CA | — | — | — | — | — | — | ** | ** | ** | 11.9 | 75:25 S:T |
| 36 | " | CF₃Cl | 400 | 60 | 0.40 | 5.0 | yellow | ** | ** | ** | 12.9 | S |
| Control F | PE | — | — | — | — | — | — | ** | ** | ** | 1.8 | T |
| 37 | " | CF₃Cl | 400 | 60 | 0.40 | 5.0 | yellow | ** | ** | ** | 6.6 | S+ |

**not measured
+Film ultimately breaks because of stretching

Several experiments were performed to demonstrate the effectiveness of plasma priming in improving the adhesion of a variety of coating materials to biaxially oriented polypropylene. The priming was carried out substantially as in Example 1. Control samples were not plasma-primed. Results are tabulated below:

TABLE III

Adhesion of Various Coatings to Plasma-primed BOPP

| Example | Coating Type | Thickness, micrometers | Adhesion, N/cm | Mode of Failure |
|---|---|---|---|---|
| Control H | water-based acrylic adhesive | 23 | 4.2 | T |
| 38 | water-based acrylic adhesive | 20 | 9.2 | T |
| Control I | Solvent-based butadiene/styrene block copolymer | 22 | 9.2 | T |
| 39 | Solvent-based butadiene/styrene block copolymer | 22 | 12.1 | T |
| Control J | water-based isooctyl acrylate/n-octylacrylamide/sodium styrene sulfonate terpolymer | 23 | 4.8 | T |
| 40 | water-based isooctyl acrylate/n-octylacrylamide/sodium styrene sulfonate terpolymer | 23 | 7.5 | T |
| Control K | solvent-based butyl acrylate/acrylic acid copolymer | 19 | 2.8 | T |
| 41 | solvent-based butyl acrylate/acrylic acid copolymer | 19 | 5.1 | T |
| Control L | acrylic hot melt adhesive | 41 | 7.21 | T |
| 42 | acrylic hot melt adhesive | 41 | 20.7 | S |

The preceding examples show how plasma priming techniques can be used in the practice of the invention. The following examples show the use of corona discharge priming.

EXAMPLES 43 AND 44

Samples of 50-micrometer biaxially oriented polypropylene (BOPP), 30 cm wide, were subjected to corona discharge treatment in CF₃Cl or CF₂Cl₂ gas. The corona treater consisted of two ceramic-coated cylindrical electrodes separated from a grounded steel drum by a gap of about 0.9 mm. The film to be treated was passed around the drum while high voltage (on the order of 5,000 volts) was applied across the narrow gap, breaking down the gas and initiating a corona discharge. The entire electrode assembly was contained within a closed chamber which permitted the use of gaseous atmospheres other than air. The chlorofluorocarbon gases were flushed through the chamber at high flow rates to maintain the oxygen concentration in the discharge region at less than 100 ppm. Treatment conditions included 1000 watts of total net power at 30 kHz and a web speed of 4 m/minute, affording about 0.4 second of exposure time. Optical emission spectroscopy confirmed the similarity in the optical emissions from CF₃Cl plasmas and CF₃Cl coronas. Analysis of the corona-treated BOPP by ESCA revealed the presence of both chlorine and fluorine on the polymer surface.

| Example | GAS | Cl:C | F:C | O:C |
|---|---|---|---|---|
| 43 | CF₃Cl | 0.58 | 0.47 | 0.11 |
| 44 | CF₂Cl₂ | 0.36 | 0.10 | 0.13 |
| Control M | Air | — | — | 0.18 |

It will be noted that both the fluorine and oxygen levels on the treated surfaces were higher than those typically obtained with plasma chlorination processes, perhaps because of the higher power per molecule or the greater amount of oxygen contaminant present in the corona process.

The corona-treated films were coated with a 95:5 isooctyl acrylate:acrylic acid copolymer emulsion blend dispersed in heptane/isopropanol and evaluated using the 90° adhesion test previously described. Results are tabulated below, using the same abbreviations for mode of failure as in the preceding tables.

| Example | Gas | Adhesion N/cm | Mode of Failure |
|---|---|---|---|
| 43 | CF$_3$Cl | 12.0 | S |
| 44 | CF$_2$Cl$_2$ | 9.9 | 25:75 S:T |
| Control M | Air | 8.3 | 25:75 S:T |
| Control A |  | 6.2 | T |

There is, as might be suspected, certain inherent variation in the optimum process conditions for treating different films in accordance with the invention. For example, retensilized polypropylene appears to require shorter exposure times and/or lower power than does biaxially oriented polypropylene. If excess exposure, power, or both are employed, it is possible to encounter the phenomenon of "detackification", where pressure-sensitive tape samples lose their adhesive properties upon aging.

Further corona priming experiments were carried out in the same general manner as in Examples 43 and 44, as shown in Table IV below; Examples 43 and 44 are repeated for convenience in reference. In addition to the 90° adhesion test employed in those examples, a 180° peel test was performed. The primed surface was placed in contact with an anodized aluminum plate bearing a butadiene:acrylonitrile cold seal adhesive, rolled six times with a 2-kg roller, and allowed to remain at room temperature conditions for 24 hours. A free end of the film was then doubled back on itself at 180° and stripped away at about 230 cm/minute, failure occurring at the film surface in all cases.

Normally tacky and pressure-sensitive adhesive (PSA) tape is typically provided with a low adhesion backsize (LAB) to prevent the adhesive from transferring to the back while the tape is wound in roll form and to reduce the force required to unwind such rolls. It is important that the LAB remain firmly bonded to the backing, because if it transfers to the PSA while in the roll, the adhesive ability of the tape is significantly reduced. One test that is used to determine whether transfer has taken place involves (1) measuring the adhesion to a glass plate of cellophane tape having a rubber-resin PSA, (2) mounting a second strip of the tape on an LAB-coated film firmly mounted on a glass substrate by means of a double-coated PSA tape, and (3) removing the tape and again measuring its adhesion to glass. The difference between initial and subsequent adhesion to glass should be as low as possible, any reduction being attributable to the presence of LAB removed.

The following table shows the ability of PSA tape made in accordance with this invention to resist transfer of the LAB to the PSA while in the roll. In each case, 50-micrometer biaxially oriented polypropylene film was coated on the face side with a standard amount of 95:5 isooctyl acrylate:acrylic acid copolymer PSA and on the back side with one of three typical LABs. In some cases the film was left untreated before applying the LAB and in other cases it was treated in various ways. Results are tabulated below:

TABLE V

| | | LAB Adhesion to Plasma-Primed BOPP | | | | |
|---|---|---|---|---|---|---|
| | | | Adhesion | Adhesion to Glass, N/cm | | |
| Example | Backing Treatment | Type of LAB | to LAB, N/cm | Initial | Subsequent | Decrease |
| Control P | — | Acrylate | 1.1 | 8.1 | 4.4 | 3.7 |
| Control Q | Air Corona | " | 3.6 | 7.8 | 7.3 | 0.5 |
| Control R | HardLen Primer 5% | " | 3.9 | " | 7.2 | 3.4 |
| 51 | CF$_3$Cl Plasma* | " | 3.6 | " | " | 0.6 |
| Control Q | " | Polyurethane | 0.44 | " | 0 | 7.8 |
| Control R | Air Corona | " | 2.8 | " | 7.2 | 0.6 |
| Control S | Hardlen Primer 5% | " | 3.3 | " | " | " |
| 52 | CF$_3$Cl Plasma* | " | 3.3 | " | " | " |
| Control T | — | Fluorochemical | 3.5 | 8.0 | 2.2 | 5.8 |
| 53 | CF$_3$Cl:CF$_2$Cl$_2$ Plasma** | " | 4.6 | " | 6.1 | 1.9 |

*conditions substantially the same as in Example 1
**conditions substantially the same as in Example 27

Samples of 50-micrometer BOPP were treated at substantially the same conditions as Example 1 (cf. CF$_3$Cl plasma) and Example 50 (CF$_3$Cl corona). A conventional solvent-based flexographic ink was then printed onto the treated surfaces and air dried. Two tests were performed to evaluate adhesion, as follows:

Using the procedure described in ASTM standard D-3359-78, Method B, the coated surface was cross-

TABLE IV

| | | | Corona Priming of Biaxially Oriented Polypropylene Film | | | | | | | |
|---|---|---|---|---|---|---|---|---|---|---|
| | | | Film | | | ESCA of Treated Layer | | | 90° | | 180° Peel |
| Example | Gas | Net Power, Watts | Tempera- ture, °C. | Web Speed, m/min | Exposure Time, Sec. | Cl:C | F:C | O:C | Adhesion, N/cm | Mode of Failure | Adhesion N/cm |
| Control M | air | " | 22 | 4 | 0.35 | ** | ** | 0.18 | 8.3 | 25:75 S:T | ** |
| Control A | — | — | — | — | — |  |  |  | 6.2 | T | 0.5 |
| 43-38 | CF$_3$Cl | 1000 | 22 | 4 | 0.35 | 0.58 | 0.42 | 0.11 | 12.3 | S | — |
| 44 | CF$_2$Cl$_2$ | " | " | " | " | 0.36 | 0.10 | 0.13 | 8.6 | 10:90 S:T | — |
| 45 | CF$_3$Cl | " | " | 2 | 0.70 | ** | ** | ** | — | T | 4.6 |
| 46 | " | " | " | 4 | 0.35 | 0.37 | 0.27 | 0.23 | 9.0 | T | 5.2 |
| 47 | " | 250 | " | " | 0.25 | ** | ** | ** | 7.4 | T | 4.6 |
| 48 | " | 1000 | " | 10 | 0.14 | ** | ** | ** | 9.0 | T | 5.2 |
| 49 | " | " | " | 50 | 0.03 | 0.14 | 0.06 | 0.13 | 8.8 | T | 3.9 |
| 50 | " | " | 104 | 4 | 0.35 |  |  |  | 12.8 | S | 6.6 | hatched into one-mm squares by cutting with a razor blade. A pressure-sensitive adhesive tape (cellulose acetate backing, acrylate psa) was then pressed firmly into contact with the cross-hatched surface and quickly stripped away. Using the classification found in the ASTM Standard, both samples were rated "5", indicating no removal of the ink. In contrast, when the same test was performed on BOPP that had been treated with a 1% Hardlen solution, the rating was "1", indicating 35-65% of the surface was flaked or detached. When untreated BOPP is subjected to the same test, it received a rating of "0", indicating that more than 65% of the surface had been removed.

All four of the samples were then rubbed vigorously with a "Kleenex" tissue using moderate finger pressure, and the amount of ink removed noted. It was hard to remove any ink at all from either the plasma-treated or the corona-treated surface, and all the ink was easily removed from untreated BOPP.

Samples of 35-micrometer biaxially oriented PET, containing slip agent, were treated in a $CF_3Cl$ plasma at the same plasma conditions as Example 34 and then coated with a conventionally-cured magnetic iron oxide dispersion. Three days following coating and "heat set aging", adhesion was tested in substantially the same manner as the modified form of ASTM Standard D-33589-78, discussed above. When the tape was removed from the cross-hatched area, there was no detectable removal of the coating from the plasma-treated surface, while a significant amount of coating was removed from the untreated PET control surface. When the same test was repeated using masking tape, which has a much more aggressive PSA, there was still no removal of coating from the plasma-treated surface.

Another test commonly employed to evaluate adhesion of magnetic coatings to a backing involves vigorously scratching with a fingernail and observing the amount of coating removed. In this subjective test, results are evaluated as follows: no material removed, 1; slight amount of material removed, 2; most of material removed, 3; all of material removed, 4. Any value of less than 2.5 is considered acceptable. When this test was performed on the plasma-treated and control samples, their respective ratings were 2 and 4.

We claim:

1. A coated article comprising a shaped polymer article having a chlorine-containing surface layer no more than about 10 nanometers thick, the chlorine:carbon ratio in said layer being greater than the fluorine:carbon ratio, if fluorine is present, not exceeding 0.9 and being inversely related to the distance from the outermost face of said layer, and a coating firmly adherently bonded to said face, the force required to remove the coating being at least about 2 N/cm greater than the force to remove the same coating from a polymer article that is identical except that it lacks a chlorine-containing surface layer.

2. The coated article of claim 1 wherein the coating is an organic material.

3. The article of claim 2 wherein the coating is an adhesive.

4. The article of claim 3 wherein the adhesive is a normally tacky and pressure-sensitive adhesive.

5. The article of claim 2 wherein the coating is a low adhesion backsize.

6. The article of claim 1 wherein the overall chlorine:carbon ratio of the surface layer is in the approximate range of 0.05-0.90 and the surface layer also contains fluorine.

7. The article of claim 1 wherein the shaped polymeric article is a self-supporting film.

8. The article of claim 7 wherein the film comprises a polyester, polycarbonate, cellulose acetate, or polyalkene.

9. The article of claim 8 wherein the film comprises polyethylene or polypropylene.

10. The article of claim 1 wherein the chlorine:carbon ratio is in the range of 0.15 to 0.6.

* * * * *